(12) United States Patent
Julien et al.

(10) Patent No.: US 6,565,126 B1
(45) Date of Patent: May 20, 2003

(54) MULTIPURPOSE GROUP, AND INDUSTRIAL ROBOT EQUIPPED THEREWITH

(75) Inventors: Regis Julien, Saint Arnoult (FR); Monique Antonio-Julien, Saint Arnoult (FR)

(73) Assignee: Elocab Sonderkabel GmbH, Georgensgmund (DE)

( * ) Notice: Subject to any disclaimer, the term of this patent is extended or adjusted under 35 U.S.C. 154(b) by 0 days.

(21) Appl. No.: 09/601,058

(22) PCT Filed: Jan. 26, 1999

(86) PCT No.: PCT/FR99/00144

§ 371 (c)(1),
(2), (4) Date: Sep. 28, 2000

(87) PCT Pub. No.: WO99/37947

PCT Pub. Date: Jul. 29, 1999

(30) Foreign Application Priority Data

Jan. 26, 1998 (FR) .............................. 98 00804

(51) Int. Cl.[7] .................. F16L 39/04; F16L 11/22
(52) U.S. Cl. .................. 285/122.1; 285/123.15
(58) Field of Search .................. 285/123.1, 123.15, 285/122.1; 138/112, 113

(56) References Cited

U.S. PATENT DOCUMENTS

| 3,765,728 A | 10/1973 | Peruglia |
| 3,809,128 A | 5/1974 | Tateisi et al. |
| 4,553,938 A | 11/1985 | Olsen |
| 4,930,544 A | * 6/1990 | Ziu .............................. 138/113 |
| 5,265,652 A | * 11/1993 | Brunella ...................... 285/236 |
| 5,375,480 A | 12/1994 | Nihei et al. |
| 5,497,810 A | * 3/1996 | Berger et al. ................ 138/113 |
| 5,791,380 A | * 8/1998 | Onan et al. .................. 138/113 |
| 5,911,155 A | * 6/1999 | Webb .......................... 138/113 |
| 5,913,336 A | * 6/1999 | Ingram ........................ 138/112 |
| 6,046,404 A | * 4/2000 | Figenschou et al. ......... 138/112 |
| 6,123,110 A | * 9/2000 | Smith et al. ................. 138/113 |
| 6,145,545 A | * 11/2000 | Hartnagel et al. ........... 138/113 |
| 6,231,087 B1 | * 5/2001 | Ziu ........................ 285/123.16 |

FOREIGN PATENT DOCUMENTS

| DE | 2940868 C2 | 4/1981 |
| EP | 0 080 591 | 6/1983 |
| EP | 0 593 786 A1 | 4/1994 |
| FR | 2 554 904 | 5/1985 |
| FR | 2 697 378 | 4/1994 |
| GB | 2 068 785 | 8/1981 |

* cited by examiner

Primary Examiner—Eric K. Nicholson
(74) Attorney, Agent, or Firm—Greer, Burns & Crain, Ltd.

(57) ABSTRACT

A group or assembly includes a conduit for transporting a working fluid and a connection along the same fluid path. The connection is mounted freely inside the conduit. At each conduit end, a joining piece provides for the connection at the transition between inside and outside parts of the fluid path. The connection passes right through the joining piece without a break. An advantage of this invention is its usefulness for groups used for connecting mobile elements in industrial robots.

27 Claims, 3 Drawing Sheets

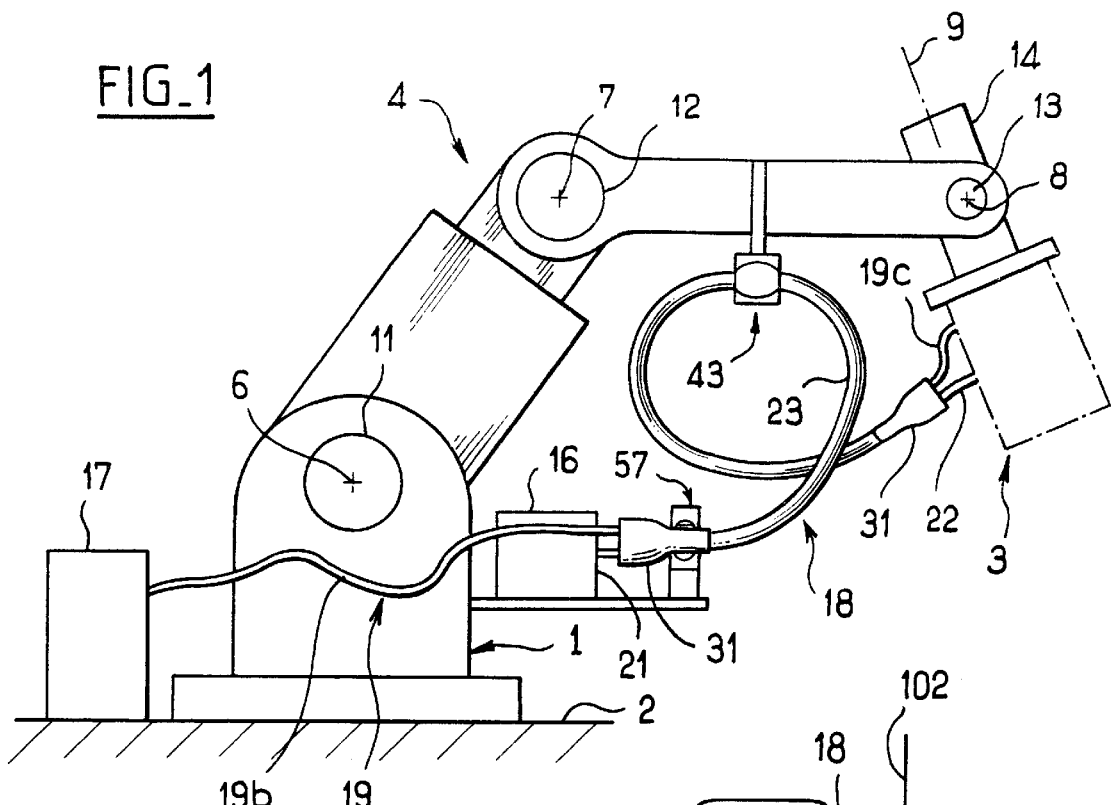
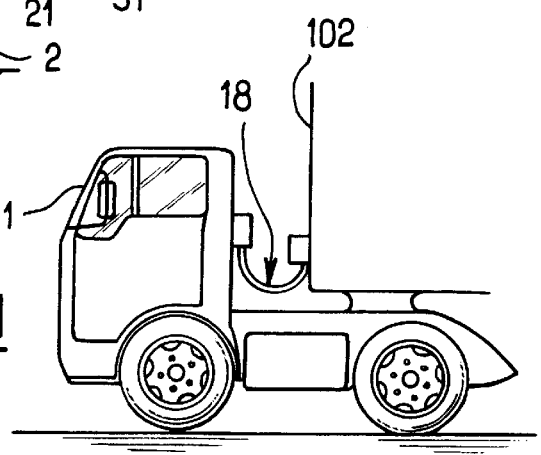
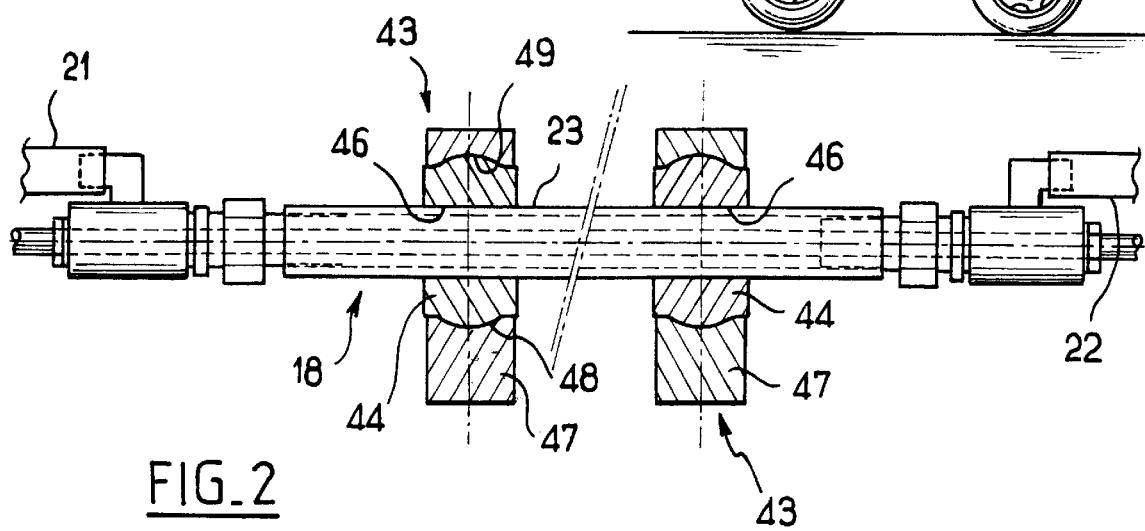

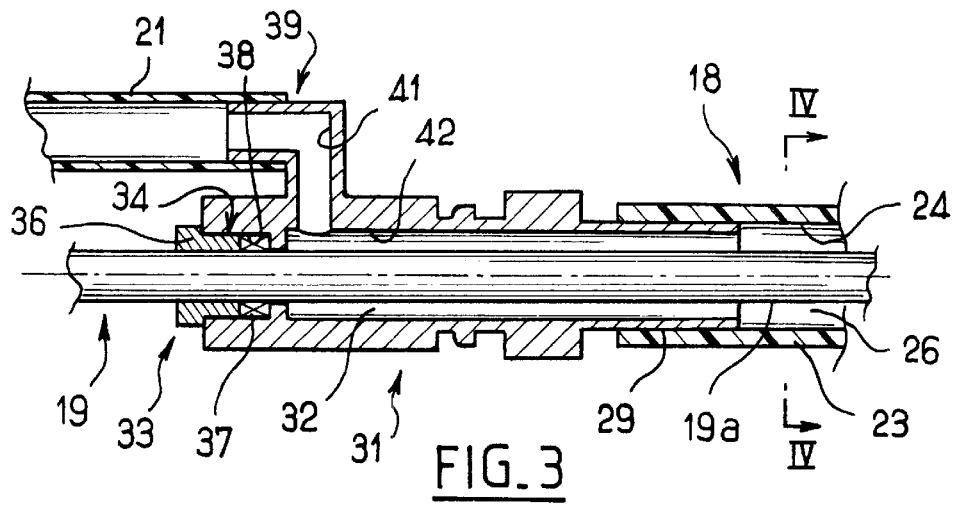
FIG. 3
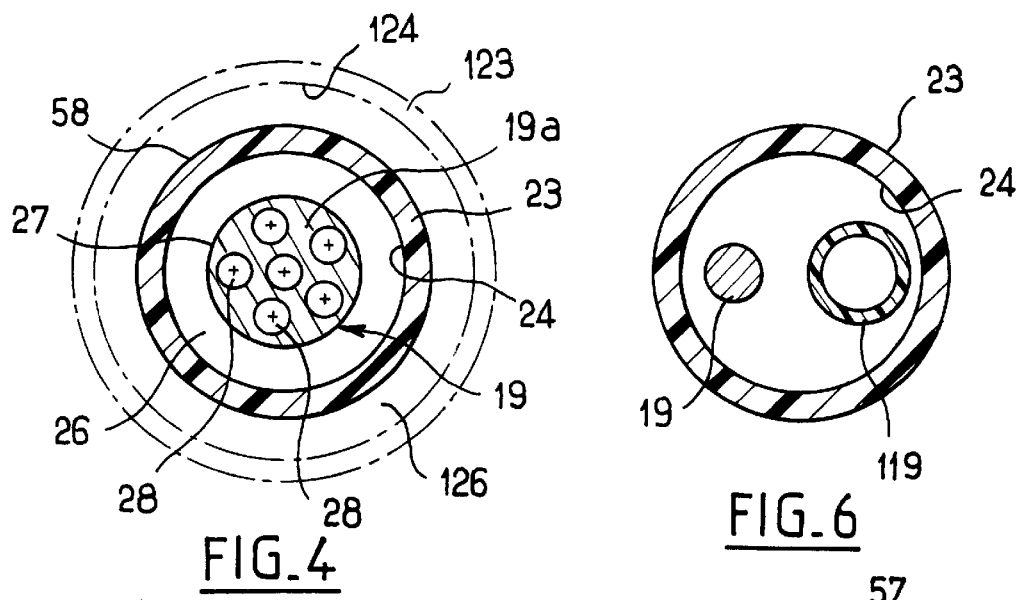
FIG. 4
FIG. 6
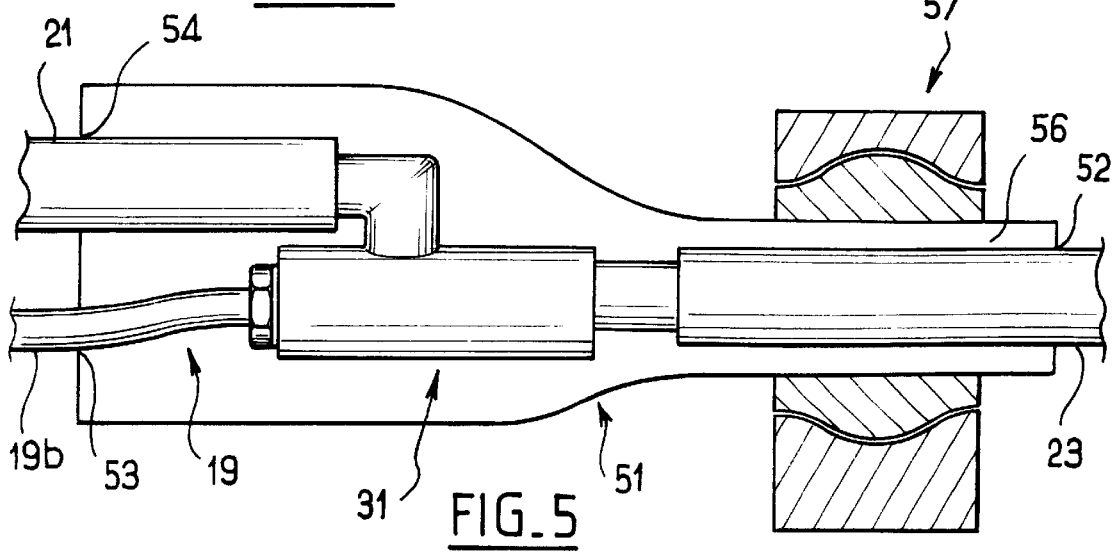
FIG. 5

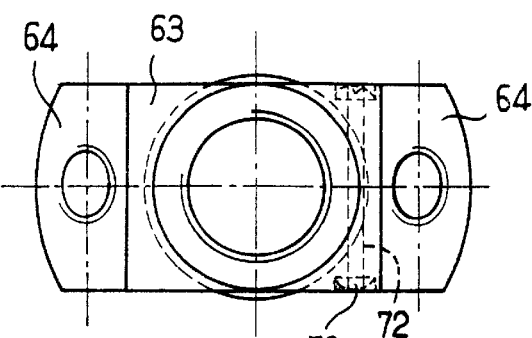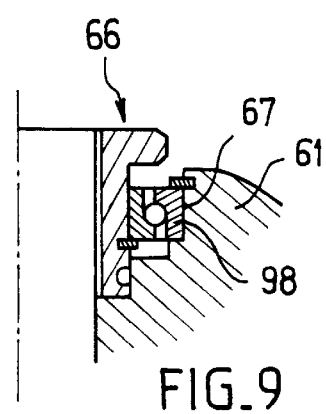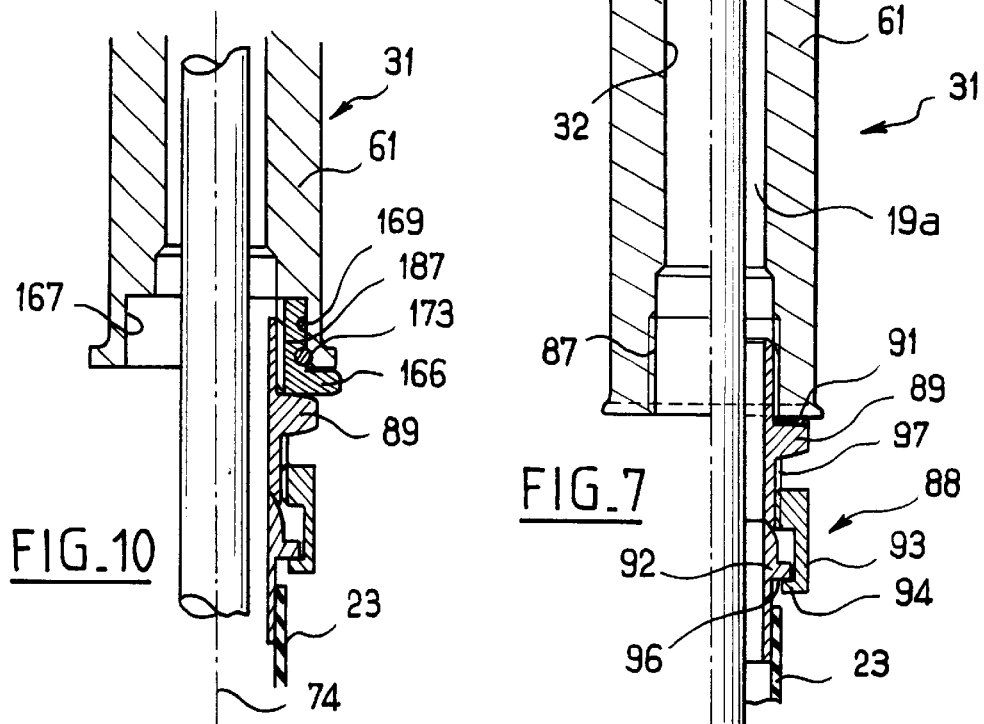

MULTIPURPOSE GROUP, AND INDUSTRIAL ROBOT EQUIPPED THEREWITH

The present invention relates to a multi-function bundle for performing a multi-function connection between two assemblies one at least of which is movable with respect to the other, in particular in an industrial robot or otherwise between a tractor or towing vehicle and a trailer of a commercial road vehicle assembly. The invention is thus more particularly directed to industrial and/or relatively heavy equipment.

The present invention also relates to an industrial robot equipped therewith, more specifically an object-manipulation robot.

Industrial robots generally comprise a fixed base and a mobile tool connected to the base by a support having variable geometry and often having many degrees of freedom.

The tool is generally a sophisticated device necessitating numerous connections, which can be of various natures, electrical, fluidic, optical, etc . . . , with control or supply devices carried by the base or stationary with respect to the latter. It is known, for this purpose, to provide flexible connections grouped into a bundle. These bundles are expensive, bulky and necessitate many precautions. In particular, it is necessary that the length and disposition of the bundle are compatible with all of the possible positions and movements of the tool with respect to the base. In particular, it is necessary that the bundle should assume an acceptable curved configuration, without the formation of folds, for all of the positions of the tool. Furthermore, each line or conduit forming the bundle must be protected from damage of mechanical, chemical or other origin.

Consequently, the present-day bundles for robots are heavy and expensive.

There is known for other applications, for example from FR-A-2 697 378 and EP-A-00 80 591, conduits which are partitioned internally to form separate passages for two different fluids, or for a fluid on the one hand and electrical connections on the other hand. This type of conduit is very expensive to manufacture and necessitates very costly adaptation to be carried out for each precise case of application.

The purpose of the present invention is to propose a multi-function, compact, economic and high-performance bundle.

According to the invention, the multi-function bundle comprising a conduit for the canalisation of a fluid and at least one connecting line extending along the conduit, which conduit has an internal face delimiting the space reserved for the said fluid, is characterised in that the connecting line is installed inside said internal face.

The connecting line can have any function such as electrical, optical, canalisation of a second fluid, etc . . . depending on the application. The canalisation conduit does not have to be made in a particular way as the connecting line is preferably simply fitted inside the conduit, without occupying a specific compartment in it nor being integrated with the wall of the conduit.

This astonishingly simple arrangement provides substantial advantages. The cost of the conduit is not increased. Besides the canalisation of the fluid, the conduit also serves as a protective cover for the connecting line. The latter is therefore no longer exposed directly to external sources of damage. Furthermore, the conduit and the connecting line extending inside of it protect one another mutually against the formation of radii of curvature that are too small when the bundle is deformed.

In an advantageous version, the bundle comprises, at least at one of the ends of the canalisation conduit, a distributor end-piece procuring for the connecting line a fluid-tight transition between the inside and the outside of the canalisation conduit.

The invention is not limited to a bundle for the transmission of a single fluid and a single other medium. The connecting line can itself be a multi-function line, for example it may consist of an electric cable with several channels. There can be several connecting lines fitted in a substantially parallel manner inside the conduit. At least one of these lines can itself consist of a conduit for a second fluid.

The bundle according to the invention can also comprise a second conduit in which is fitted the previously mentioned canalisation conduit. The second conduit carries a second fluid in the annular space contained between the internal surface of the second conduit and the external surface of the previously mentioned canalisation conduit.

According to especially advantageous arrangements:

the connecting line extends without any discontinuity or connection from outside one distributor end-piece at one end of the bundle up to outside an other distributor end-piece at the other end of the bundle, through both said end-pieces and the canalisation conduit which connects them together, said end-pieces having no function of connection for the connecting line;

the connecting line is freely rotatable about its longitudinal axis within both end-pieces and within the canalisation conduit;

to this end, the connecting line is introduced into each end-piece through a rotatable sealing device and is free of any attachment with the canalisation conduit;

there may also be provided that the canalisation conduit is rotatable about its axis with respect to at least one of the end-pieces, preferably with respect to both end-pieces, thanks to a rotatable sealing device mounted between the end of the canalisation conduit and the corresponding distributor end-piece;

one of the distributor end-pieces comprises means for fluid communication between the canalisation conduit and two distinct connection conduits;

a distributor end-piece comprises sealing means which are independent from each other for the canalisation conduit, at least one connection conduit and the throughpassage for the connecting line;

means are provided for discoupling the canalisation conduit from the distributor end-piece without altering the leak-tight connection of the connection conduit with the end-piece nor the leak-tight mounting of the connection line through the end-piece, and/or for discoupling the canalisation conduit from the distributor end-piece without altering the leak-tight connection of the connection conduit with the end-piece nor the leak-tight mounting of the connecting line through the end-piece. In this specification "canalisation" and "canalization" are deemed interchangeable.

According to a second aspect, the invention also relates to an industrial robot comprising a base, a mobile device connected to the base by a structure having variable geometry, and a multi-function bundle extending between the base and the device, characterised in that the multi-function bundle is according to the first aspect of the invention.

Other features and advantages of the invention will furthermore emerge from the following description, given with reference to non-limitative examples.

In the accompanying drawings:

FIG. 1 is a diagrammatic view in side elevation of an industrial robot according to the invention;

FIG. 2 is a view in side elevation of the bundle according to the invention, in a straight configuration;

FIG. 3 is a view in axial cross-section, at a larger scale, of a part of the bundle shown in FIG. 2;

FIG. 4 is a view in cross-section along the line IV—IV of FIG. 3;

FIG. 5 is a diagrammatic view of a distributor end-piece of the bundle, equipped with a covering envelope;

FIG. 6 is a view similar to that of FIG. 4 but relating to a second variant embodiment;

FIG. 7 is a sectional view, with two different half-views, of an other embodiment of the end-piece;

FIG. 8 is a view of a body of the end-piece of FIG. 7;

FIG. 9 is a sectional half-view of a modified embodiment of the through-passage of the connecting line;

FIG. 10 is a sectional view of a modified embodiment of the connection between the end-piece and the canalisation conduit; and FIG. 11 is a diagrammatic part-view of a road vehicle assembly with semi-trailer, equipped with a multi-function bundle according to the invention.

In the example shown in FIG. 1, the robot comprises a base 1, securely mounted on a floor 2, and a tool 3 which is only shown very diagrammatically. It could be a manipulating tool, a welding tool, a machining tool or a complex tool combining several operations. The tool 3 uses, for its operation, at least one working fluid, for example a hydraulic or pneumatic fluid or a fluid in the form of a cooling liquid such as water. The tool 3 also uses electrical energy and/or it exchanges signals such as electrical or optical signals for its control.

The tool 3 is connected to the base 1 by way of a structure having variable geometry 4 comprising several axes of rotation 6, 7, 8 and 9, shown by way of example. The structure 4 provides the tool 3 with the necessary mobility, with respect to the base 1, for the task to be carried out by the robot. Each axis 6, 7, 8 or 9 can be associated with a drive means such as a stepper motor 11, 12, 13, 14. The robot furthermore comprises a fluidic generator 16, that is to say a hydraulic or pneumatic generator, integral with the base 1 and a cabinet 17, which is also stationary with respect to the base 1. The cabinet 17 comprises, for example, electrical power supply means and/or electrical, electronic or optical control devices and/or means for transmitting electrical energy or electrical, electronic or optical control and servo-control signals. A flexible multi-function bundle 18 connects the generator 16 and the cabinet 17 on the one hand with the tool 3 on the other hand, thereby to provide the connections which are necessary for supplying the tool 3 with energy and controlling the tool 3.

In the example shown, the bundle 18 is used as a path for a connecting line 19 going from the cabinet 17 to the tool 3 on the one hand and, on the other hand, for a working fluid between a pipe 21 connected to the generator 16 and a pipe 22 connected to the tool 3.

According to an important feature of the invention, the line 19 (FIGS. 2 to 4) comprises a middle part 19a which extends inside a canalisation conduit 23 made for example of polyurethane. The conduit 23 canalises the working fluid between the generator 16 and the tool 3, and more particularly between the connecting pipes 21 and 22. The line 19 and the conduit 23 are flexible.

The conduit 23 has a cylindrical internal surface 24 which bounds the space 26 reserved for the fluid. The middle part 19a of the line 19 is freely fitted inside the surface 24.

The cross-section seen in FIG. 4 shows that the middle part 19a of the line 19 has smaller transverse dimensions than the diameter of the internal surface 24 of the conduit 23. Thus, the space 26 reserved for the fluid has an annular shape between the internal surface 24 of the conduit 23 and the outer peripheral surface 27, which can be cylindrical too, of the line 19. As a general rule, the line 19 is everywhere surrounded by the fluid contained by the conduit 23. The fluid is in contact with the surface 27 over the whole of its periphery. This does not exclude the possibility of the line 19 touching the surface 24 in places according to the variation in the geometry of the bundle 18 when the tool 3 moves with respect to the base 1.

FIG. 4 also shows that the line 19 can be made in the form of a cable grouping several individual lines 28. These lines can, for example, be electrical lines or optical fibres.

Each end of the conduit 23 is fitted in a fluid-tight manner to the respective end 29 of a distributor end-piece 31. Thus, the internal space 26 of the canalisation conduit 23 is in fluid communication with a chamber 32 formed inside the distributor end-piece 31.

The line 19 extends axially through the chamber 32 and emerges from the distributor end-piece 31 through a fluid-tight passage 33 remote from the end 29 and coaxial with the latter. For its fluid-tightness, the passage 33 comprises a stuffing box device 34 in which a packing push rod 36 axially compresses a packing material 37 against the bottom of a packing chamber 38. The annular packing material 37, axially compressed by the push rod 36, reacts with a radial expansion towards the inside against the external surface of the connecting line 19 and towards the outside against the wall of the chamber 38.

In particular it will be noted that with the bundle according to the invention, parts 19b, 19a and 19c compose together a continuous connecting line 19 deprived of any junction, more specifically without any discontinuity from the section 19b (FIG. 1) extending from the cabinet 17 to a first distributor end-piece 31, and the middle section 19a located inside the conduit 23, and without any discontinuity between said middle section 19a and section 19c extending from the other end-piece 31 up to the tool 3. The connecting line 19 is mechanically bound to the conduit 23 only by the intermediary of the end-pieces 31 and more particularly by the stuffing boxes 34.

Each distributor end-piece 31 furthermore comprises a side connector 39 whose internal channel 41 is connected with the chamber 32 through the internal side surface 42 of the chamber 32. The diameter of the internal surface 42 of the chamber 32 is greater than the transverse dimensions of the connecting line 19. In this way there is, inside the chamber and around the connecting line 19, an annular space occupied by the fluid and this annular space is connected with the channel 41 of the side end-piece 39.

On the free end of the side connector 39 there is fitted the pipe 21 for connection with the fluidic generator 16. The pipe 22 (FIG. 1) is fitted over the free end of the side connector 39 of the other end-piece 31, close to the tool 3.

The function of the distributor end-piece 31 is to ensure, for the connecting line 19, fluid-tight and continuous transition between the inside and outside of the path of the working fluid.

FIG. 2 shows two supports 43 for the bundle 18. Each support 43 comprises an inner part 44 with an axial through-bore 46 in which the conduit 23 is fitted with a certain tightness. Each support 43 also comprises an outer support part 47. The outside surface 48 of the inner part 44 and the inside surface 49 of the outer support part 47 have substantially complementary spherical shapes which allow the inner part 44 a certain amount of ball-joint type movement inside the corresponding outer support part 47. Such a support 43 can also be seen in a more diagrammatic way in FIG. 1 for supporting the central portion of a loop formed by the bundle 18 between its two distributor end-pieces 31.

In the example shown in FIG. 5, the end-piece 31 is encased in an envelope 51 which also encases the adjacent ends of the canalisation conduit 23, of the connecting pipe 21 (or 22 for the other end-piece 31, which can be seen in FIG. 1) and the start of the region 19b (or 19c) of the line 19. This envelope 51 can be over-moulded to definitively encase the connections between the various pipes and lines and the endpiece, in such a way as to fortify these connections and their fluid-tightness. The envelope 51 can also consist of two moulded half-shells which are attached in a detachable manner around the end-piece 31. It is also possible to envisage a one-piece shell which is closed by a removable frontal plate comprising a hole for the passage of the section 19b (or 19c respectively) of the connection 19 and another hole for the passage of the connecting pipe 21 (or 22 respectively). In all cases, the envelope 51 comprises an outlet 52 for the conduit 23, an outlet 53 for the connection 19 and an outlet 54 for the connecting pipe 21. The envelope 51 has an aesthetic purpose and a protective purpose. The region 56 of the envelope 51 which surrounds the end of the canalisation conduit 23 can be associated with a support 57 similar to the supports 43 of FIG. 2. Such a support 57 is also shown in FIG. 1 in association with the end-piece 31 at the end nearest the base.

In a variant shown in dotted and dashed line in FIG. 4, the canalisation conduit 23 can itself be freely fitted inside a second conduit 123 which can for example also be made of flexible polyurethane. The inside surface 124 of the conduit 123 has a bigger diameter than that of the outer surface 58 of the conduit 23 in order to form between the surfaces 124 and 58 an annular space 126 for a second fluid. The ends of a bundle thus improved are fitted out in a corresponding manner. For example, it is possible to provide two successive distributor end-pieces. The first end-piece, adjacent to the end of the conduit 123 then serves to ensure, for the canalisation conduit 23 and the connecting line 19 located inside of it, the transition between the inside and outside of the path provided for the second fluid. The second end-piece, located beyond the one which has just been described, can be similar to the one shown in FIG. 3.

FIG. 6 shows, in cross-section, a second variant in which the canalisation conduit 23 contains two connecting lines 19, 119 extending parallel with one another but externally of each other, both of them being inside the inside surface 24 of the conduit 23. The line 19, which is not shown in detail, can for example consist of a cable grouping several individual lines as shown in FIG. 4. In the example shown in FIG. 6, the line 119 is a conduit for a fluid which must be separated from the one canalised by the conduit 23.

With such a variant embodiment, the distributor end-piece is adapted to have, for example, two fluid-tight passages such as 33 placed side by side, one for the line 19 and the other for the conduit 119. In this case, the lines 19 and 119 both traverse the distributor end-piece without discontinuity.

In the example shown in FIGS. 7 and 8, which will be described only as to its differences with respect to that of FIG. 2, the end-piece 31 comprises a generally cylindrical body 61. At its end remote from the canalisation conduit 23, the body 61 is provided with a widening portion 62 terminating in a front end-face 63 located between two bevelled end-faces 64.

The through-passage 63 through which the connecting line 19 is axially guided out of the end-piece 31 through the front face 63 is no longer made directly in the body 61 of the end-piece, but is provided by the orifice of a bushing 66 which is mounted to be axially rotatable in a counter-bore 67 formed in the body 61. Before assembly, the chamber 32 opens out of the end-piece 31 through the counter-bore 67. The bushing 66 is provided on its peripheral outer face with a distal groove 68 receiving an O-ring 69 for performing leak-tightness between the bushing and the counter-bore 67, and a proximal groove 71, which is closer to the outside of the body 61 than the distal groove 68. The proximal groove 71 axially corresponds with a tangential drilling 72 (see also FIG. 8). A pin 73 inserted into drilling 72 and into part of the proximal groove 71 axially locks bushing 66 within the counter-bore 67 while allowing the bushing 66 to rotate about longitudinal axis 74 of the end-piece 31, which is in coincidence with the axis of the connecting line 19. The static seal device 134 is now mounted between the connecting line 19 and the bushing 66. In the example which is shown, the static sealing device 134 is of a type available on the market capable of converting an axial tightening obtained by screwing, into a leak-tight radial engagement against the outer peripheral wall of the connecting line 19. The sealing device 134 comprises a tube 76 which is adapted to be screwed into the bushing 66 which is innerly threaded. An elastomeric sealing ring 77 is sealingly secured against an inner peripheral wall of the tube 76. At its end pointing towards outside the end-piece 31, the tube 76 is terminated by an annular ring of fingers 78 capable of being deflected radially inwardly for compressing the ring 77 against the connecting line 19. The static sealing device 134 finally comprises a nut 79 adapted to be screwed onto an outer thread 81 formed on the tube 77 before the fingers 78. The nut 79 carries a cup 82 which radially and inwardly urges the fingers 78 during tightening of the nut 79 onto the thread 81 of the tube. At the end of tightening, there is produced an immobilisation of the connecting line 19 with the tube 76 and consequently with the bushing 66 due to the friction produced between the peripheral wall of the connecting line 19 and the ring 77 secured to the tube 76. Thus, the connecting line 19 is rotatable with respect to the body 61 of the end-piece 31, or conversely by a relative rotation of the bushing 66 and of the body 61 about the axis 74.

It is preferred that the end-piece 61 at the other end of the multi-function bundle be provided with the same structure as that which has just been described for allowing a relative rotation between the body of the end-piece and the connecting line 19. Thus, not only the connecting line 19 extends without any discontinuity nor any connection throughout the whole multi-function bundle and more specifically through both end-pieces 31 and the canalisation 23 which connect them, but, moreover, the connecting line is completely freely rotatable with respect to both end-pieces 31 and with respect to the canalisation conduit 23. This embodiment of the invention especially emphasizes the idea on which the invention is based, which is not properly speaking what is often found in the state of the art in the form of a kind of heterogeneous cable grouping various connections, but rather on using a canalisation as a mere positioning and protection guide for the connecting line.

According to another feature of the invention, the chamber 32 of the end-piece 31 comprises two connectors 39 which are each adapted to communicate with a respective connection pipe 22. This allows the distributor end-piece 31 to simultaneously perform a function of a distributor for the fluid guided by the canalisation conduit 23 towards several utilisation points, e.g. if the tool of the robot is moved by several fluid motors. If a particular implementation needs only one connection pipe, one of the connectors 39 can be obturated by a leak-tight cap 83.

More particularly, the end-piece shown in FIG. 7 may correspond to the end-piece on the tool side 3 of FIG. 1. The end-piece 31 on the base side of the robot may be in compliance with that of FIG. 7 while using the cap 83 on one of the connectors 39, since there is normally only one pressurized fluid source for the canalisation 23. In a modified embodiment, it is possible to use on the base side of the robot a different end-piece 31 having only one connector 39. The widening portion 62 of the body 61 may then have an asymmetric shape with respect to the axis 74. Such an asymmetric end-piece may also be used with a robot needing only one connector 39 or the tool-side. Besides, it is also easily possible to realise an end-piece 31 having more than two connectors 39, for example in a fan-shaped arrangement on a widening portion 62 which would be more flared out than that of FIG. 7, or else in a crown arrangement around axis 74, etc.

Each connector 39 is provided with an oblique bore 84 providing a communication between chamber 32 and the outside through the respective bevelled front face 64, before assembly.

Each bore 84 is provided with an inner thread 86 starting from its opening. Similarly, on the side of the canalisation conduit 23, the chamber 32 opens through an innerly threaded bore 87. The conduit 22 and 23 are each connected to the body 61 of the end-piece by a respective releasable coupling device 88 which is shown in the shape of a standard union comprising an element 89 screwed in the respective inner thread 86 or 87 with a seal 91 therebetween, an element 92 on which the respective pipe 22 or 23 is fitted, and a tightening nut 93 which is captive on element 92. The nut 93 is provided with a radially inner collar 94 engaging the rear side of a shoulder 96 of element 92, and is adapted to be screwed onto an outer thread 97 of the element 89 thereby to sealingly abut elements 89 and 92 end-to-end in a sealing and centred manner, and realise thereby between the inside of the respective pipe 22 or 23 and the chamber 32 a leak-tight continuity vis-à-vis the outside. For simplifying FIG. 7, reference numerals 89-97 appear only in the bottom of FIG. 7 but the drawing clearly shows that the reference numerals could appear as well on each of the two connecting devices 88 associated to both connection pipes 22 in the upper right and upper left portion of FIG. 7. Thus, contrary to devices of the state of the art, each pipe 22 or 23 has an autonomous sealing and attachment with the body 61 of the end-piece, and this allows the use of standard connection devices and allows the discoupling of anyone of the pipes without altering the connection of the other pipes nor the leak-tight through-passage of the connecting line. Moreover, the bundle according to the invention allows use of standard connection devices or, al least, freely selected connection devices at each end of the connecting line 19 beyond the end-pieces 31, as well as at each end remote from the end-pipes 31, of each of the connection pipes 22 or of the pipe 21 of FIG. 1.

In the example shown in FIG. 9, which will be described only for its differences with respect to FIGS. 7 and 8, the freely rotatable mounting between the bushing 66 and the body 61 of the end-piece 31 is no longer implemented by a proximal groove 71 with which a pin 73 interferes, but by means of a roll bearing 98 interposed between the outer face of the bushing 66 and the inner face of the counter-bore 67 which is correspondingly widened and shaped.

In the example shown in FIG. 10, which will be described only as to its differences with respect to FIG. 7, a possibility of rotation about the axis 74 is provided between the canalisation conduit 23 and the body 61 of the end-piece 31. To this end, in the example illustrated, the element 89 of the coupling device 88 pertaining to the pipe 23, instead of being secured to the body 61 by screwing in an inner threading 87 of the body 61, is screwed in an inner threading 187 of a bushing 166 which is sealingly and freely rotatably mounted in the body 61 quite similarly to the bushing 66 of FIG. 7. The body 61 is provided, to this end, with a counter-bore 167 and the bushing 166 is provided with a distal groove on its outer peripheral wall for a O-ring 169, and with a proximal groove for a pin 173 providing an axial locking. Thus, the end-piece 31, especially on the tool-side, is allowed to rotate in a free manner with respect to the canalisation conduit 23 which is for example, suspended as shown is FIG. 1.

In the example shown in FIG. 11, a multi-function bundle 18 according to the invention is mounted between the tractor 101 and the semi-trailer 102 of an articulated road vehicle assembly, for supplying the semi-trailer 102 with pressurized air as well as with various electrical controls. This reduces the number of mechanically separated connections which are necessary between the tractor 101 and the semi-trailer 102 for performing the usual functions necessary for braking, lighting, etc. Of course, the invention may also be used in the same manner between a carrier truck and a trailer coupled to this truck.

The invention is not of course limited to the examples described and shown.

For example, it would be possible to combine the variants of FIGS. 4 and 6 by placing the canalisation conduit 23, shown in FIG. 6, inside a conduit of larger diameter such as 123, shown in FIG. 4.

The bundle according to the invention can constitute only of a portion of the connections necessary between devices which are mobile with respect to one another in a robot. A robot can comprise several bundles. For example, in comparison with the embodiment shown very diagrammatically in FIG. 1, it would be possible for there to be, for the stepping control of the motors 12, 13, 14 and for their power supply, another bundle between the base, or units integral with the base, and each of these motors which are mobile with respect to the base.

The fittings of the pipes and conduits are shown very diagrammatically. In practice their structure is adapted to the fluids and to the pressures used.

A source of cooling fluid could furthermore be provided in addition to the generator 16 or in place of the latter, depending on the needs of the tool used.

The rotation possibility of conduit 23 with respect to the distributor end-piece 31 according to FIG. 10 may be used even if the connecting line 19 is secured to the body 61 as illustrated for example in FIG. 3. Besides, it may be also considered to realise a possibility of rotation between the connecting pipes 21 or 22 and the body of the end-piece 31 by means of a rotatable sealing device. Generally speaking, the immobilization or on the contrary the possibility of rotation of the body of the end-piece with respect to each connection or canalisation function extending through the end-piece or being connected to the end-piece is decided as a function of the foreseeable movement between the various units which are mechanically interconnected by the bundle.

What is claimed is:

1. A multi-function bundle comprising:
   a conduit for canalisation of a fluid, said conduit having an internal surface delimiting a space reserved for said fluid;

at least one connecting line extending along the conduit inside said internal surface;

at least at one of the ends of the canalisation conduit, a distribution end-piece ensuring, for the connecting line, a transition between the outside and the inside of the canalisation conduit;

wherein each said distributor end-piece comprises:
   a passage through which the connecting line continuously extends;
   a first sealing means for sealing between the periphery of said passage and the outer surface of the line with respect to the fluid guided by said canalisation conduit;
   a chamber communicating with the canalisation conduit and opening to the outside by way of a connector for inlet or respectively outlet of the fluid guided by said canalisation conduit; and
   a second sealing means being independent from the first sealing means for fitting said connector.

2. A bundle according to claim 1, further including that the connecting line is fitted such that an external surface of the connecting line is in contact with the fluid canalised by the conduit.

3. A bundle according to claim 2, further including that the external surface of the line is a peripheral surface of the line and is in contact with the fluid over the whole of its periphery.

4. A bundle according to claim 1, further including that over at least part of the length of the conduit, the line is mechanically free with respect to the conduit.

5. A bundle according to claim 1, further including that the line and the conduit are flexible.

6. A bundle according to claim 1, further including that the conduit is itself housed in the internal space of a second conduit of larger diameter, canalising an the annular volume contained between an inside surface conduit and an outside surface of said canalisation conduit.

7. A bundle according to claim 1, further including at least two connecting lines extending approximately parallel with one another inside said canalisation conduit.

8. A bundle according to claim 1, further including that said at least one connecting line comprises a conduit for a fluid.

9. A bundle according to claim 1, further including that said connecting line is a cable.

10. A bundle according to claim 1, further comprising one said distributor end-piece at each end of the canalisation conduit, each said distributor end-piece performing a transition between the outside and the inside of the canalisation conduit for the connecting line which extends free of any discontinuity and coupling from the outside of one of the end-pieces through this end-piece, through the canalisation conduit and through the other end-piece up to the outside of said other end-piece.

11. A bundle according to claim 1, further including that the connecting line is positioned with respect to the canalisation conduit only by way of said distributor end-piece at least at one of the ends of the canalisation conduit.

12. A bundle according to claim 1, further including that the passage is substantially axial and the connector is disposed laterally.

13. A bundle according to claim 1, further including that the first sealing means comprises a stuffing box or similar sealing device allowing the transformation of an axial tightening into a radial sealing engagement.

14. A bundle according to claim 1, further including that the passage is formed in a bushing which is mounted for free rotation in a body of the end-piece.

15. A bundle according to claim 14, further including that the connecting line is freely rotatable over itself with respect to the whole canalisation conduit and within a distributor end-piece at each end of the canalisation conduit.

16. A bundle according to claim 1, further including that the distributor end-piece comprises at least two connectors via which the chamber communicates with outside for distributing the fluid being guided, to at least two destination points or collecting said fluid from at least two sources.

17. A bundle according to claim 1, further including a rotatable seal device between at least one of the ends of the canalisation conduit and the corresponding distributor end-piece.

18. A bundle according to claim 1, further including an envelope fitted over the distributor end-piece and having three outlets, one for the canalisation conduit, one for the inlet/outlet of fluid and one for the connecting line.

19. A bundle according to claim 18, further including that the envelope is equipped with a bundle support.

20. A bundle according to claim 1, further including that the connecting line is axial within the ends of the canalisation conduit.

21. An industrial robot comprising a base, a movable device connected to the base by a structure having variable geometry and a bundle connected to the movable device, further including that the bundle is configured according to claim 1.

22. A multi-function bundle comprising:
   a conduit for canalisation of a fluid, said conduit having an internal surface delimiting a space reserved for said fluid;
   at least one connecting line extending along the conduit inside said internal surface;
   at least at one of the ends of the canalisation conduit, a distributor end-piece ensuring for the connecting line, a transition between the outside and the inside of the canalisation conduit; and
   an envelope fitted over the distributor end-piece and having three outlets, one for the canalization conduit, one for the inlet/outlet of fluid and one for the connecting line.

23. A bundle according to claim 22, further including that the envelope is equipped with a bundle support.

24. A bundle according to claim 23, comprising:
   a ball-joint type relationship of the envelope with the bundle support.

25. A multi-function bundle comprising:
   a canalisation conduit for canalisation of a fluid, said conduit having an internal surface delimiting a space reserved for said fluid;
   at least one connecting line extending along the conduit inside said internal surface;
   at least at one of the ends of the canalisation conduit, a distributor end-piece ensuring, for the connecting line, a transition between the outside and the inside of the canalisation conduit;
   wherein each distributor end-piece comprises:
      a body defining a chamber communicating with said canalisation conduit; and
      a bushing mounted for free rotation within said body and defining a passage through which said connecting line continuously extends, wherein said connecting line is sealed within said passage, with respect to said bushing.

26. A bundle according to claim 25, further including that the connecting line is freely rotatable about a centerline thereof with respect to the whole canalisation conduit and within said distributor end-piece at each end of the canalization conduit.

27. A bundle according to claim 23, further including that the line and the conduit are flexible.

* * * * *

UNITED STATES PATENT AND TRADEMARK OFFICE
CERTIFICATE OF CORRECTION

PATENT NO. : 6,565,126 B1
DATED : May 20, 2003
INVENTOR(S) : Julien et al.

It is certified that error appears in the above-identified patent and that said Letters Patent is hereby corrected as shown below:

Column 9,
Line 32, delete "canalising an the annular volume" and insert -- canalising a second fluid in the annular volume --.

Signed and Sealed this

Eighteenth Day of May, 2004

JON W. DUDAS
*Acting Director of the United States Patent and Trademark Office*